(12) United States Patent
Hartley et al.

(10) Patent No.: US 8,598,846 B1
(45) Date of Patent: Dec. 3, 2013

(54) DEVICE AND METHOD FOR STABILIZING A BATTERY PACK

(75) Inventors: Thomas T. Hartley, Mogadore, OH (US); Benjamin Magistro, Odenton, MD (US); Thomas Vo, Akron, OH (US)

(73) Assignee: The University of Akron, Akron, OH (US)

( * ) Notice: Subject to any disclaimer, the term of this patent is extended or adjusted under 35 U.S.C. 154(b) by 274 days.

(21) Appl. No.: 12/756,107

(22) Filed: Apr. 7, 2010

Related U.S. Application Data

(60) Provisional application No. 61/167,173, filed on Apr. 7, 2009.

(51) Int. Cl.
*H02J 7/00* (2006.01)
*H02H 9/00* (2006.01)
*H02H 7/00* (2006.01)

(52) U.S. Cl.
USPC .......................................... 320/122; 320/118

(58) Field of Classification Search
USPC ................. 320/118, 122, 124, 127, 119, 120; 429/56; 361/54–61
See application file for complete search history.

(56) References Cited

U.S. PATENT DOCUMENTS

| | | | |
|---|---|---|---|
| 5,168,205 A * | 12/1992 | Kan et al. ....................... | 320/160 |
| 5,283,512 A * | 2/1994 | Stadnick et al. ............... | 320/122 |
| 5,656,915 A * | 8/1997 | Eaves ............................. | 320/118 |
| 5,670,861 A * | 9/1997 | Nor ................................. | 320/118 |
| 5,714,869 A * | 2/1998 | Tamechika et al. ........... | 320/101 |
| 5,850,136 A * | 12/1998 | Kaneko ........................ | 320/119 |
| 5,905,360 A * | 5/1999 | Ukita ............................. | 320/118 |
| 5,932,990 A * | 8/1999 | Kaneko ........................ | 320/122 |
| 5,952,815 A * | 9/1999 | Rouillard et al. ............. | 320/116 |
| 7,256,516 B2 * | 8/2007 | Buchanan et al. ............. | 307/62 |
| 7,927,726 B2 * | 4/2011 | Kim ............................... | 429/56 |
| 2009/0091293 A1 * | 4/2009 | Wang et al. ................... | 320/118 |

* cited by examiner

*Primary Examiner* — Richard V Muralidar
*Assistant Examiner* — Steve T Chung
(74) *Attorney, Agent, or Firm* — Renner, Kenner, Greive, Bobak, Taylor & Weber

(57) ABSTRACT

The present invention generally relates to a device and method for stabilizing a battery pack, wherein the battery pack stabilization device has a by-pass circuit to prevent individual cell overcharge. In one embodiment, the present invention relates to an efficient balancing and monitoring system for use in an electric vehicle that utilizes nickel-zinc-based batteries. In another embodiment, the present invention relates to a device that permits over-voltage protection as well as the ability to monitor cell voltage. In still another embodiment, the present invention provides a method to coordinate multiple packs of cells within a vehicle so a driver could be aware of possible distance and time parameters, as well as a monitoring or alert system to inform the driver of reduced power, thus preventing damage to the cells.

5 Claims, 16 Drawing Sheets

DEVICE AND METHOD FOR STABILIZING A BATTERY PACK

RELATED APPLICATION DATA

This patent application claims priority to U.S. Provisional Patent Application No. 61/167,173, filed on Apr. 7, 2009, entitled "By-Pass Circuit for Batteries," the entirety of which is hereby incorporated by reference herein.

FIELD OF THE INVENTION

The present invention generally relates to a device and method for stabilizing a battery pack, wherein the battery pack stabilization device has a by-pass circuit to prevent individual cell overcharge. In one embodiment, the present invention relates to an efficient balancing and monitoring system for use in an electric vehicle that utilizes nickel-zinc-based batteries. In another embodiment, the present invention relates to a device that permits over-voltage protection as well as the ability to monitor cell voltage. In still another embodiment, the present invention provides a method to coordinate multiple packs of cells within a vehicle so a driver could be aware of possible distance and time parameters, as well as a monitoring or alert system to inform the driver of reduced power, thus preventing damage to the cells.

BACKGROUND OF THE INVENTION

The growing popularity of electric devices and electric vehicles allow users to work and play free of restrictive power cords, gas combustion engines and/or chargers. Additionally, vehicles that utilize battery power for a portion, or all, of their "fuel" needs are gaining favor as people move away from a dependency on fossil fuel-based transportation.

Thus, if electric vehicles are to become practical and commonplace in society, batteries must first become much more reliable—providing a longer run time, longer useful life, and more efficiency in the recharging process. Some of the common rechargeable battery chemistries available today include: lithium-iron-phosphate ($LiFePO_4$); nickel-zinc (Ni—Zn); and nickel-metal hydride (NiMH).

The problem with each of these battery chemistries is that they each have a different specific set of attributes which describes how it will behave, and a different methodology on how it is to be treated. Deviation from these parameters can shorten the life of a battery or even destroy it. This presents a challenge for both device developers and those developing ways to charge the battery since they typically cannot simply be swapped out for one another. Nickel-zinc-based batteries are made using nickel and zinc electrodes, both commonly occurring elements that are not environmentally harmful, and therefore, NiZn is considered a "green" battery. Some of the other battery chemistries, such as lithium-iron-phosphate batteries, use elements that are not as common and therefore can be costly to acquire. Other chemistries, such as lead-based chemistries, are harmful to living beings.

Given this, rechargeable batteries and/or battery packs are becoming increasingly important in the advancement and marketability of vehicles that utilize less, or no, fossil fuel (e.g., petroleum-based fuels) in order to achieve mobility.

Given the high cost associated with the potential replacement of a battery pack in a hybrid, or electric, vehicle, there is a need in the art for a device and method for stabilizing a battery pack so as to achieve the longest possible useful life from such a battery pack. In one instance it would be desirable for a device and method for stabilizing a battery pack to contain a by-pass circuit to prevent individual cell overcharge.

SUMMARY OF THE INVENTION

The present invention generally relates to a device and method for stabilizing a battery pack, wherein the battery pack stabilization device has a by-pass circuit to prevent individual cell overcharge. In one embodiment, the present invention relates to an efficient balancing and monitoring system for use in an electric vehicle that utilizes nickel-zinc-based batteries. In another embodiment, the present invention relates to a device that permits over-voltage protection as well as the ability to monitor cell voltage. In still another embodiment, the present invention provides a method to coordinate multiple packs of cells within a vehicle so a driver could be aware of possible distance and time parameters, as well as a monitoring or alert system to inform the driver of reduced power, thus preventing damage to the cells.

In one embodiment, the present invention relates to a balancing and monitoring system for a nickel-zinc battery pack having two or more individual cells, the system comprising: at least one by-pass circuit; at least one means to permit the selective individual charging and/or discharge of a battery cell; at least one control means to permit the balancing of the individual battery cells relative to one another; and at least one monitoring means, the monitoring means designed to permit the system to monitor individual cell voltages, wherein the system enables a nickel-zinc battery pack to be monitored and balanced as needed.

In another embodiment, the present invention relates to a method of balancing and monitoring system for a nickel-zinc battery pack having two or more individual cells, the method comprising the steps of: selectively charging and/or discharging at least one battery cell; controlling the selective charging and/or discharging at least one battery cell relative to one another; and monitoring means the individual cell voltages of the two or more individual cells, wherein the method enables a nickel-zinc battery pack to be monitored and balanced as needed.

In still yet another embodiment, the present invention relates to a device and method for stabilizing a battery pack, as shown and described in the attached Figures.

DETAILED DESCRIPTION OF THE INVENTION

The present invention generally relates to a device and method for stabilizing a battery pack, wherein the battery pack stabilization device has a by-pass circuit to prevent individual cell overcharge. In one embodiment, the present invention relates to an efficient balancing and monitoring system for use in an electric vehicle that utilizes nickel-zinc-based batteries. In another embodiment, the present invention relates to a device that permits over-voltage protection as well as the ability to monitor cell voltage. In still another embodiment, the present invention provides a method to coordinate multiple packs of cells within a vehicle so a driver could be aware of possible distance and time parameters, as well as a monitoring or alert system to inform the driver of reduced power, thus preventing damage to the cells.

Figure 1:
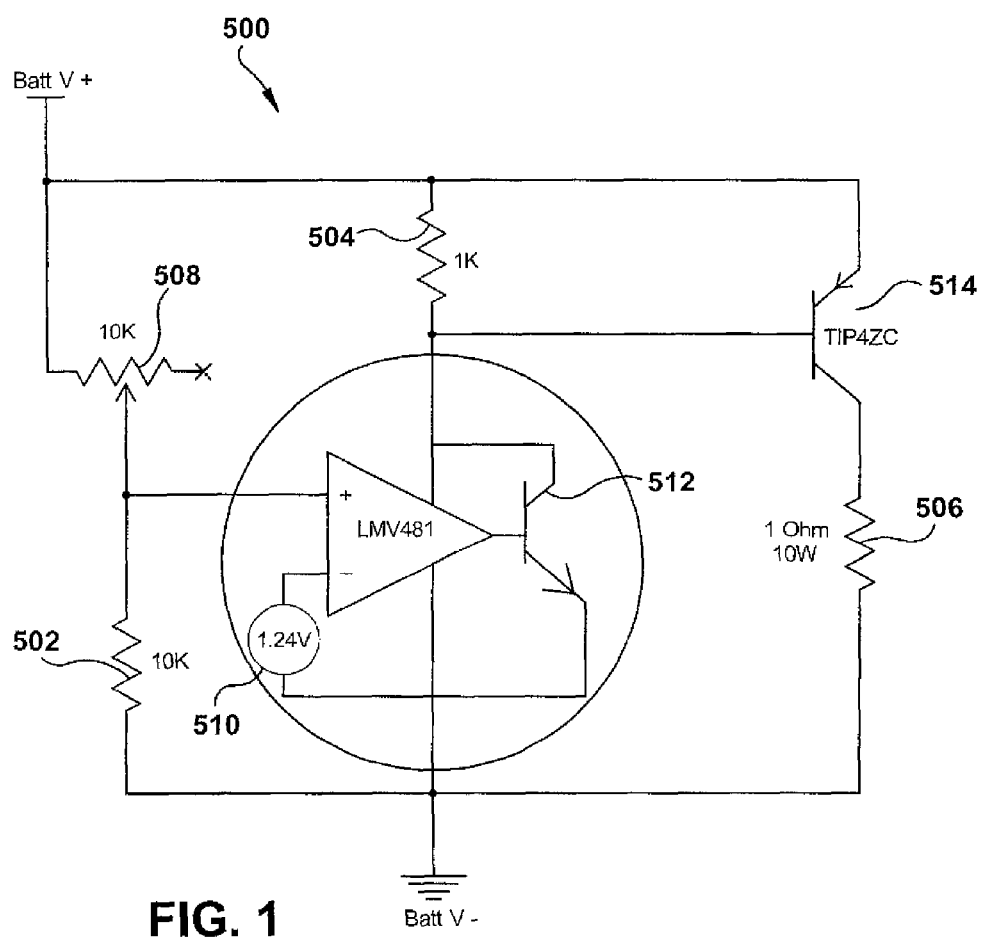
FIG. 1 is a schematic illustration of a passive/analog by-pass circuit according to one embodiment of the present invention.

Battery Balancing and Monitoring:

Analog Cell Protection:

In one embodiment, the by-pass block of the present invention is shown in FIG. 1 and provides over-voltage protection by shunting current around an individual cell. The design of FIG. 1 utilizes a power resistor, power transistor, and a precision shunt regulator. A voltage divider made up of a fixed-size resistor and a potentiometer is used as the input to the comparator of the precision shunt regulator. The combination of a fixed resistor and potentiometer allows the by-pass turn on voltage to be adjusted according to the specific battery chemistry used with the by-pass. When the voltage from the divider matches that of the reference voltage, the regulator turns on, thus engaging the power transistor, allowing current to flow through it and be shunted around the cell through the power resistor. FIG. 1 contains a diagram of the circuit described above. This shunting allows the cell to continue charging at a reduced rate while the other cells in the pack continue to charge at the full rate. This provides the basis of the over-voltage protection methodology used. Due to the low operating voltages of these cells used by eVionyx, 1.925 V max to approximately 1.25 V safe minimum, it was not practical to provide an indicator light showing that the status of the by-pass on each cell. Transistor selection is challenging, due to the low cell voltages, the transistor needs to have a low turn on and a large beta to allow the necessary current to be shunted. A fuse can be included on the ground side of this circuit to accommodate cell open circuit failures.

Figure 2:
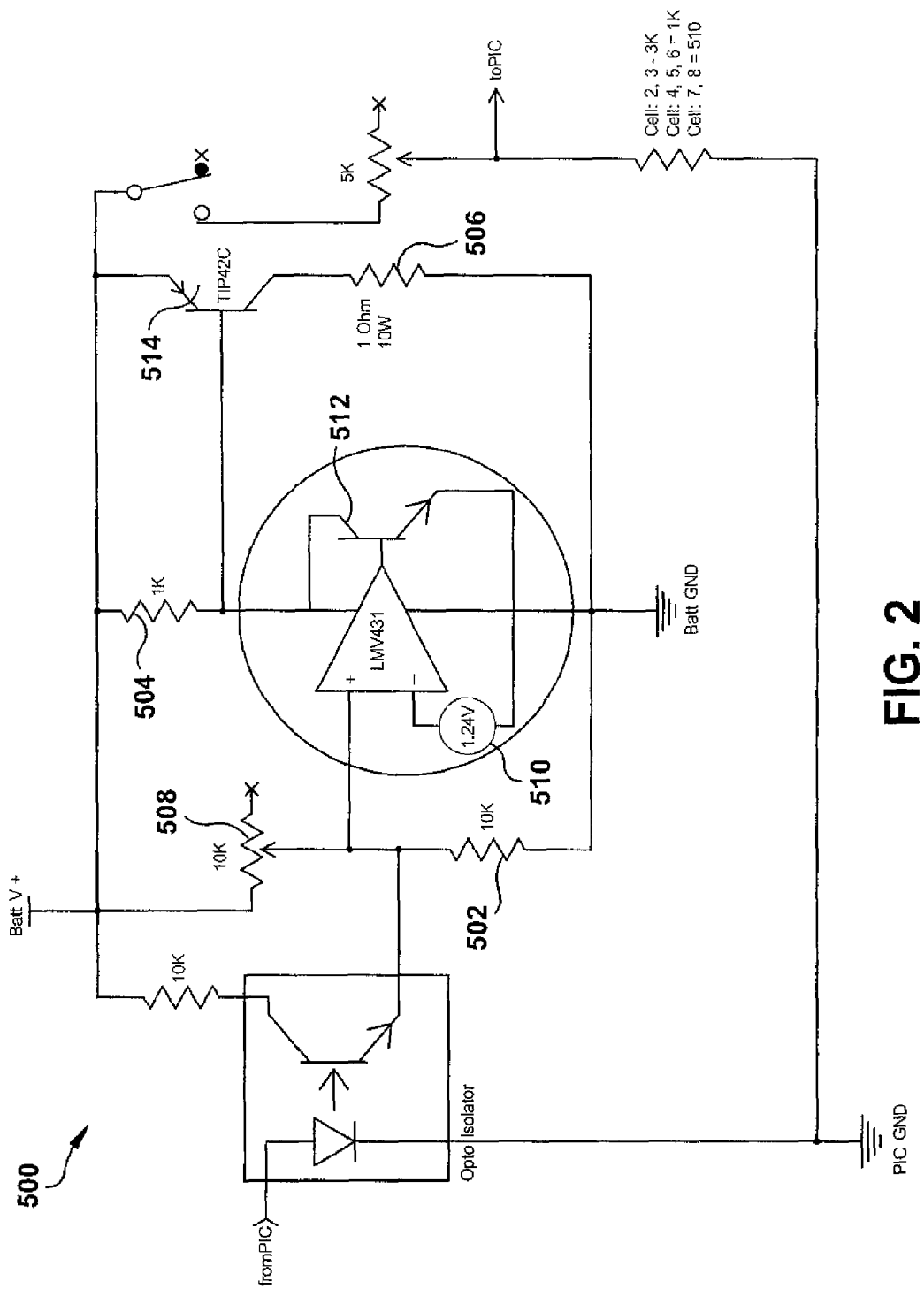
FIG. 2 is a schematic illustration of a by-pass circuit with digital controls according to one embodiment of the present invention.

Regarding the circuit of FIG. 1, circuit 500 is composed of a three resistors 502 (10000 ohms-0.25 watt), 504 (1000 ohms-0.25 watt), and 5026 (1 ohm-25 watt). Circuit 500 further comprises a variable resistor 508 that varies between 0 ohms and 10000 ohms, the circle of FIG. 1 denotes an LMV431 (from National Semiconductor) that includes among other components 1.24 volt voltage source 510 and a transistor 512, and transistor 514 is a TIP42C. The circuit of FIG. 1 is designed for use with nickel-zinc-based batteries. The circuit 600 of FIG. 2 is similar to that of FIG. 1, except that it has an additional "outer circuit loop" as illustrated therein. In that "outer loop" circuit 600 contains an additional 10000 ohm resistor (located near the opto isolator box) and a 0 ohm to 5000 ohm variable resistor (located near the upper right corner of the circuit diagram), as well as a second resistor (located in the lower right corner of the circuit diagram) that is shown as varying depending upon the nature of the cell that is attached to the circuit of FIG. 2. As shown in FIG. 2, the second resistor is selected from a 3000 ohm resistor, a 1000 ohm resistor, or a 510 ohm resistor. Regarding the additional resistors of the "outer loop," their wattage can be selected from a number of different wattage values but is in one embodiment each resistor has a wattage value of 0.25 watts.

Digital Cell Protection:

The intelligence block is implemented using a microcontroller from Microchip. This block is powered via the battery pack that the board is mounted on, and uses a 3.3 V regulator to power the controller and wireless block. The microcontroller uses an appropriate voltage divider for each cell relative to the voltage reference used with the microchip; in this case the reference is set to the supply voltage. The voltage divider on each cell is composed of a fixed resistor of appropriate size and a 5 kΩ potentiometer. This combination provides enough current for the controller to determine the voltage while not placing a significant load on the cell. The voltage is represented by a ten-bit binary value with 3.3 V being equal to 1023. Based upon this value, notice can be sent to the microcontroller to enable the by-pass. When using this setup and allowing the by-pass to be controlled by the microcontroller, it is reasonable to set the passive by-pass previously described slightly higher than the maximum active turn on. Doing this prevents interference of the two control points.

Figure 3:
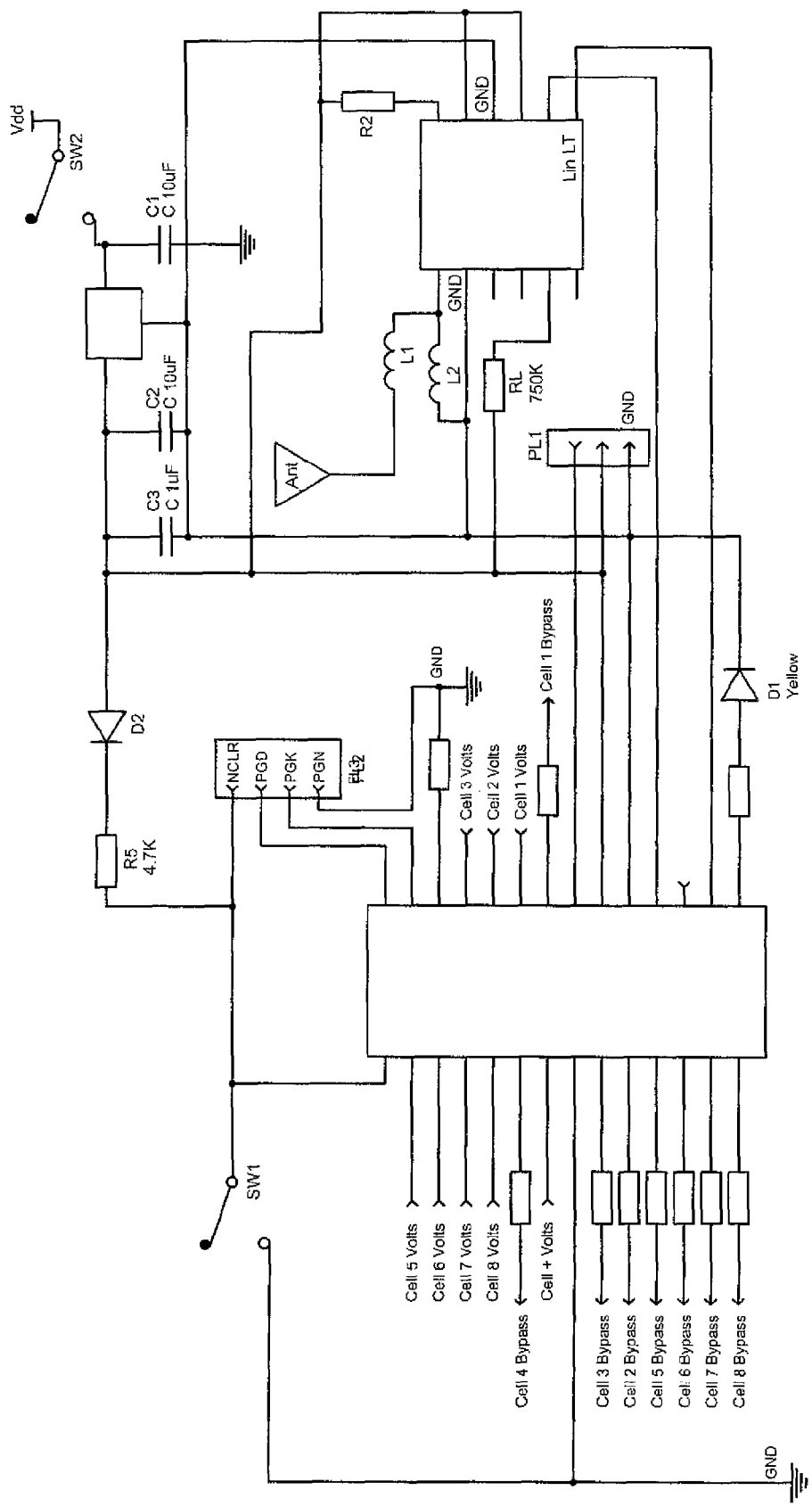
FIG. 3 is a schematic illustration of a cell manager unit according to one embodiment of the present invention.

The by-passes are enabled through the use of an optical isolator and an additional 10 kΩ resistor. The optical isolator is needed to simplify the control method since the last cell in the pack would be at +15 V relative to ground. Since the microcontroller is running at 3.3 V it is not possible to simply inject a signal to raise the voltage that is entering the comparator within the shunt regulator. This approach included using an optical isolator and an additional resistor in parallel with the existing voltage divider for the passive by-pass. By placing the two resistors in parallel, it decreases the resistance and increases the voltage being provided to the shunt regulator, thus allowing it to turn on. FIG. 2 is a schematic illustration of one embodiment of a passive analog circuit with the added components for digital control. FIG. 3 is a schematic illustration of one embodiment of a microcontroller and related circuitry designed for use in each sub-pack in conjunction with the present invention. In addition to being able to turn on the by-pass, it has the ability to adjust the turn-on voltage using data accumulated from a predetermined previous time period. The by-pass turn-on is adjusted to turn one A/D unit up, or one A/D unit down, if needed, while still ensuring the new value stays within preset limits. This adjustment helps keep the cell voltages closer together by adjusting for cells that may not have been as heavily discharged as others in the pack.

Master Controller Communications:

In one embodiment, there is a small communications block which permits the individual pack balancer to communicate with the battery master controller. Information is sent from the intelligence block to the communications block where it is changed into a wireless signal. The board can transmit cell voltages and by-pass status to the master as well as state of charge information. Communication takes place by passing a virtual token around the pack to indicate which individual cell manager is allowed to communicate with the master at that time. This solves the problem of having several individual pack managers all attempting to communicate at once. While an individual pack has the token allowing it to talk, it is able to send and request data from the master. Once the pack in question has completed transferring its buffered data to the master, the master then passes the token on to the next pack to be queried.

These blocks work together to keep the cells from being over-charged while the vehicle is being charged or when regenerative breaking is in use. Over-discharging cannot be prevented as easily, and is typically implemented in the motor controller with low-voltage power cut-backs and cut-offs. Also, the battery pack master receives the voltages from individual cells, and can alert the driver when a cell begins to go low. The driver then has the ability to see that certain cells have been discharged to lower than desired voltages through the added intelligence and communication taking place. The driver also has the ability stop or adjust their driving style based upon the information provided. This combination of information and control will minimize damage due to over discharge when used in an electric vehicle.

Implementation:

The nickel-zinc battery cells are setup in a string, with some cells being pre-grouped as a package. To solve the problem of over-charging and resultant damage, the passive by-pass described above is implemented on the cells. This provided the first step of the management system used. Testing confirms that adjusting the by-pass turn on is helpful as cells aged. Using the passive by-pass circuit as the base, the necessary intelligence to monitor the cell voltages, turn on, and adjust the by-passes is then added. This permits one to control the cell voltages and allow such voltages to stay closer together.

Figure 4:
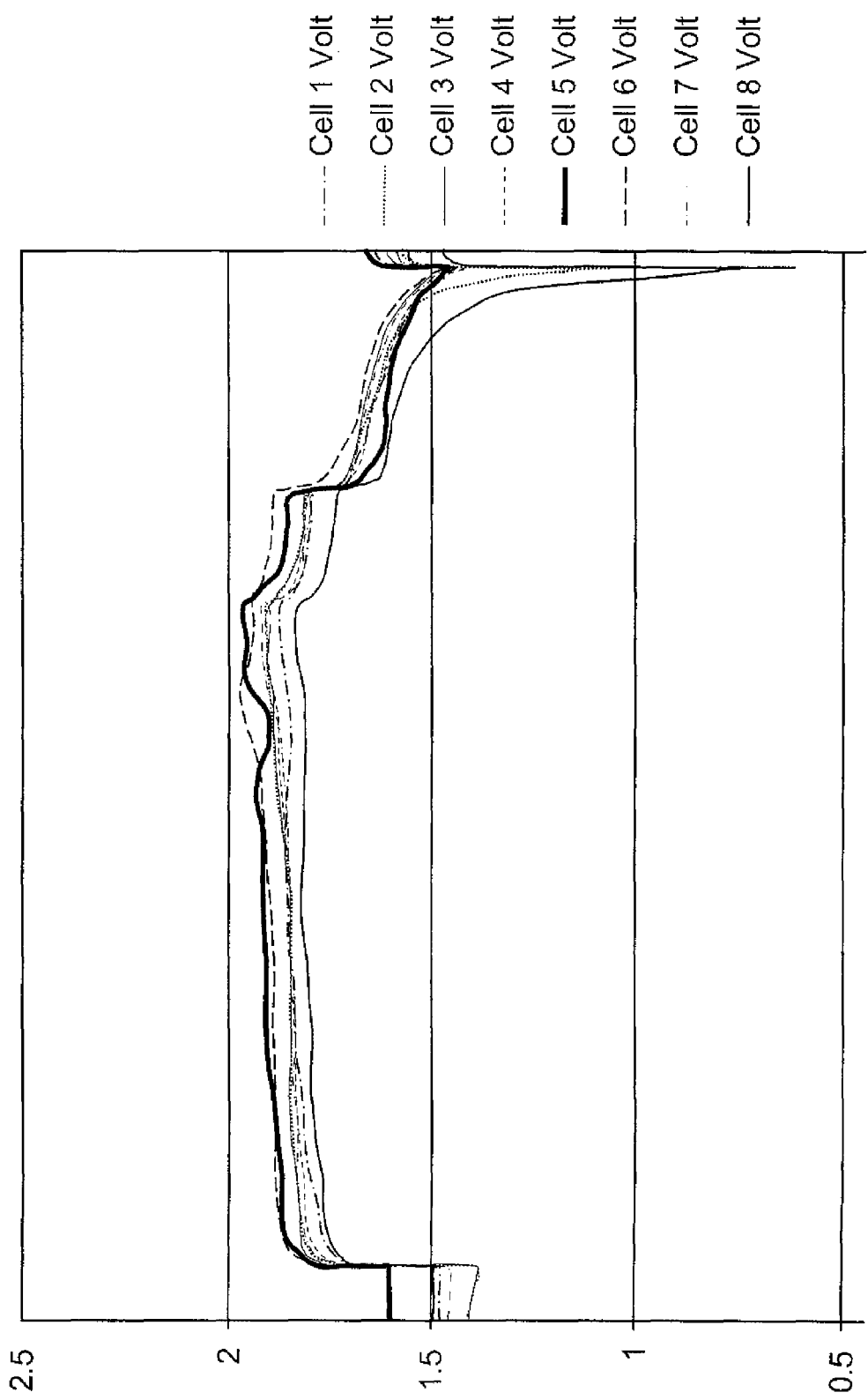
FIG. 4 is a graph illustrating various charge/discharge cycles in a battery pack.

The testing of this design took place with an 18 Ah nickel-zinc battery pack that is automatically cycled several times each day. The charge cycle is set at a constant current of C/4 or approximately four and a half amps hours with a voltage limit to help prevent damage. Charge cycles are controlled by a relay attached to a timer. The timer permits the pack to charge for about four hours. The supply used is a regulated bench top power supply. The discharge is at a rate of approximately nine amp hours or C/2 through a resistor bank. The pack is allowed to discharge for about 90 minutes. FIG. 4 provides a graph of cell voltages during a typical charge-discharge cycle showing the functionality of the cell over-voltage protection.

Additional Example:

Although the example below is explained in reference to an Xellerion Xell-18 battery pack, the present invention is not limited thereto. Rather, the present invention can be utilized in conjunction with any multiple cell battery pack. In one embodiment, the present invention can be utilized in conjunction with battery packs having any suitable number of battery cells including, but not limited to, up to about 10 battery cells, up to about 25 battery cells, up to about 50 battery cells, up to about 100 battery cells, or even about 250 or more battery cells. Here, as well as elsewhere in the specification and claims, individual numerical values and/or numerical limits can be combined to form non-disclosed ranges.

Battery Packs:

A Xellerion Xell-18 battery pack is subjected to performance testing for about one month in order to generate a sufficient amount of data. In this example, the battery packs are composed of eight Ni—Zn electrochemical cells connected in series. The voltage on each cell is normally allowed to vary between 1.92 volts (V) near full charge, and 1.3 volts (V) near zero charge. Each cell is rated at 18 Ahr for a 0.5 C, or 9 A, discharge. In this example, the pack is composed of eight of these cells connected in series, the pack voltage can then range from 15.36 V near full charge, to 10.4 V near zero charge, with a capacity of 18 Ahr for a 0.5 C, or 9 A, discharge.

Figure 5:
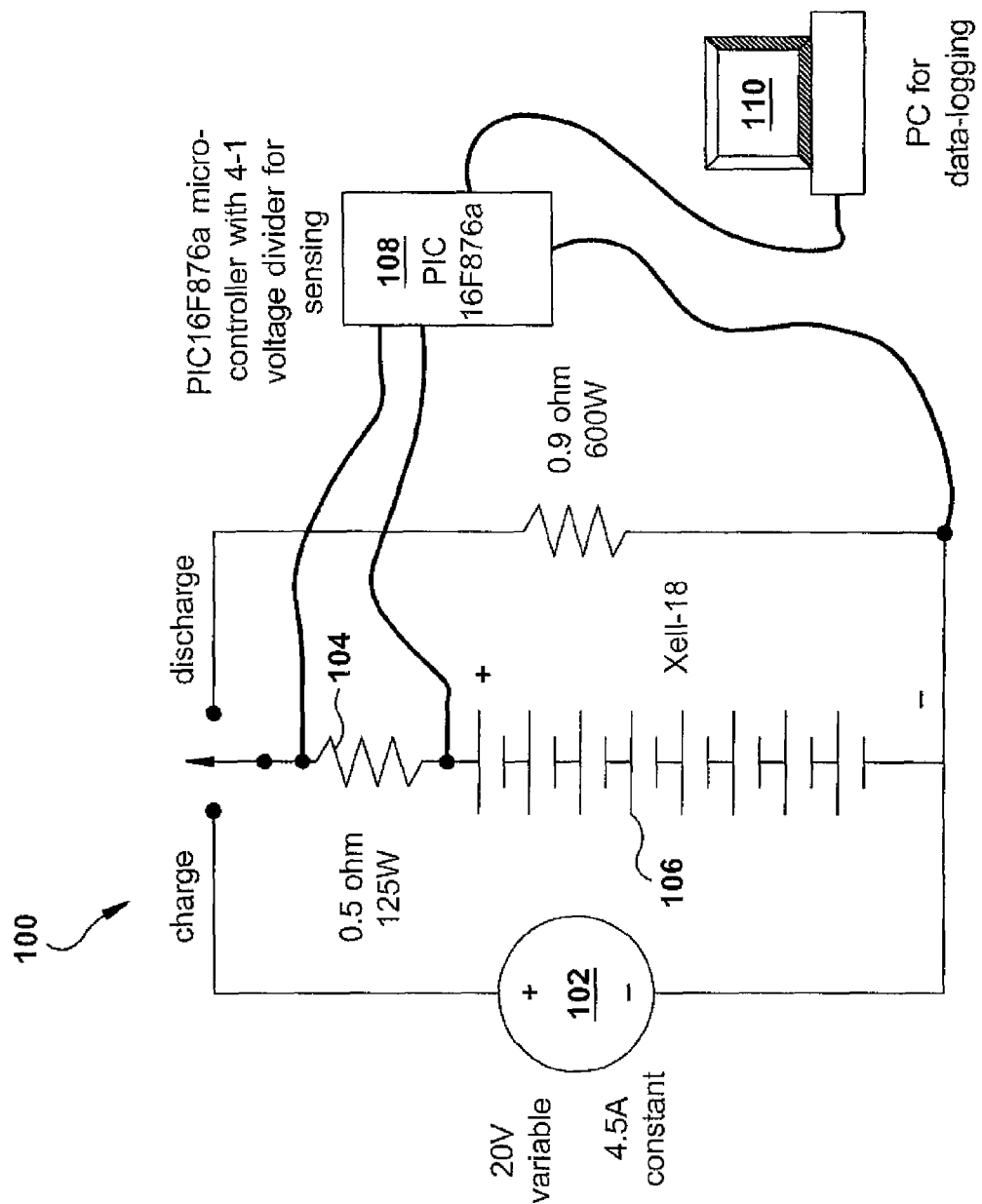
FIG. 5 is a schematic illustration of a testing apparatus according to one embodiment of the present invention.

Testing Apparatus:

A testing apparatus 100 in accordance with one embodiment of the present invention is shown in FIG. 5. Charging is controlled by a constant current power supply 102, which maintains the current at roughly 4.5 A. Discharge is controlled by a constant resistance load, of 1.4 ohms total. A 0.5 ohm resistor 104 is placed in series with the battery pack 106 to monitor the pack current. The voltage is measured on either side of the sense resistor with respect to ground to determine the current. These voltage measurements are each stepped down through 4-1 voltage dividers composed of four 1 kohm resistors in series. A PIC16F876a microcontroller 108 measures the voltages on the first resistor of the four-resistor stacks, using its on-board 10 bit ND converters, where 1023 is equivalent to 5 V. This voltage is corrected for any resistance variations using software, and then multiplied by four to provide the correct voltage. The difference of the two voltages is then multiplied by two (due to the half ohm resistor), to yield the correct current. The PIC microcontroller uses an internal clock to sample the voltages once per second, and then digitally sends the time, the two voltages, and the current to a PC 110 through a serial port for data-logging as a text (TXT) file using comma separated variables (CSV).

Figure 6:
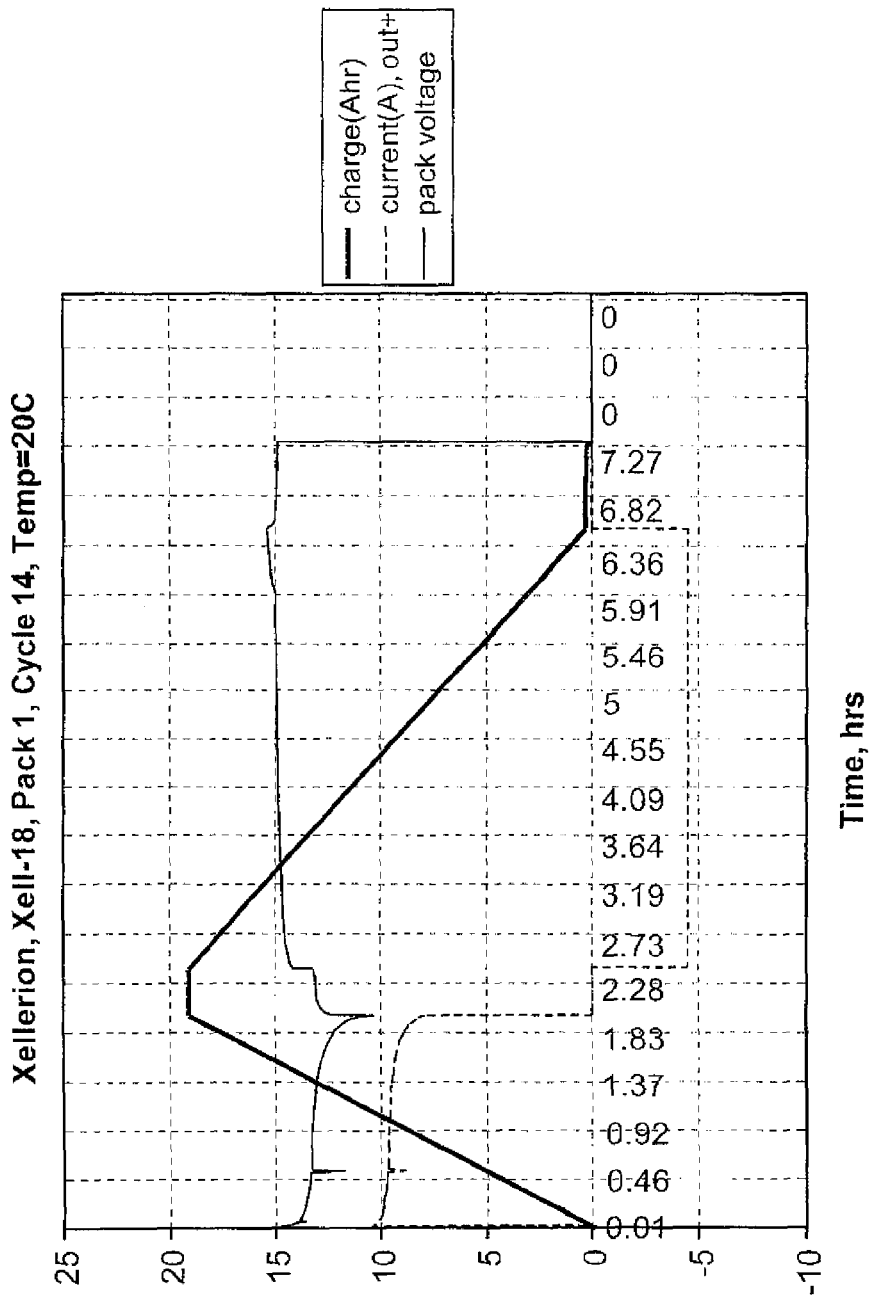
FIG. 6 is graph representing the typical discharge-charge cycle for Xell-18, showing pack voltage, current out, and Ahrs out.

Pack Performance:

A typical discharge-charge cycle is shown in FIG. 6. It can be seen that the discharge current starts at roughly 10.4 A, and decays as the pack voltage drops, to roughly 8 A at the end of discharge. At about 2 hours, the low pack voltage limit is reached, and the pack is allowed to rest for a half hour. At about 2.5 hours, the charger is connected. The pack charges for about 4 hours, until the upper pack voltage limit is reached, at which point the charger is removed and the pack is allowed to rest. The red line shows the result of amp-hour integration, which gives the charge out of the pack, which for this cycle was 19 Ahr.

The internal resistance of the cell can be approximated by dividing instantaneous changes in voltage by instantaneous changes in current, $$R \cong \frac{\Delta V}{\Delta I}.$$

Doing this calculation using the discontinuous data from FIG. 6, and other cycles, the internal resistance of the pack is about 0.025 ohms when the pack state-of-charge is above about 60 percent, and then increases up to about double that value when the pack state-of-charge is less than about 15 percent. As can be seen from Figure, FIG. 6 is a graph illustrating a typical discharge-charge cycle for Xell-18, showing pack voltage, current out, and Ahrs out.

Figure 7:
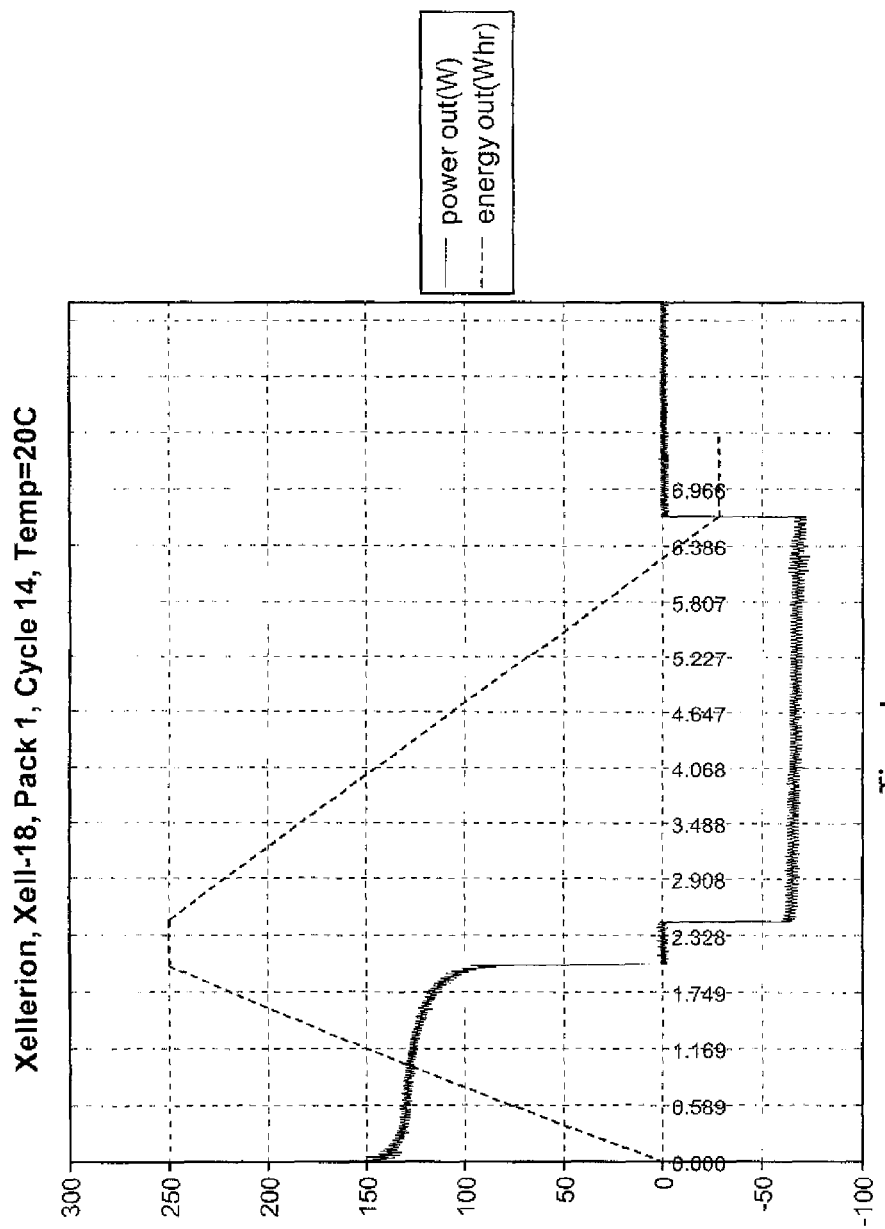
FIG. 7 is graph representing the power and energy out of Xell-18 during the same cycle as shown in FIG. 6.

FIG. 7 is a graph illustrating the power out of the pack during the same cycle of FIG. 6. The instantaneous power is calculated using P=VI from the data shown in FIG. 6. FIG. 7 also shows the energy out of the pack in watt-hours. This plot is determined by performing watt-hour integration on the power curve. It can be seen that the pack provided 250 Whr during this cycle, while an extra 28 Whrs is required during charging, yielding an energy efficiency of about 90 percent.

High Current Test:

A high current test is also performed on the pack. In this case, the pack is connected to a resistor bank which was the equivalent of 0.122 ohms rated at 2400 W. The data from this test is given in Table 1. It can be seen that the current is nearly 90 A, which is a 5 C rate, for an 8 minute test. The pack provides almost 1 kW for the 8 minute test, and provides about 123 Whrs. The test is stopped when the pack reached its low voltage limit, but it probably would have continued to provide over 80 A for several more minutes without damage. Using this data, the internal resistance is calculated again using $$R \cong \frac{\Delta V}{\Delta I}$$

at the beginning of the test, yielding $$R \cong \frac{14.39 - 11.54}{96} = 0.0297 \text{ ohms.}$$

After the test, the pack was further discharged at 9 A, with the total charge out being roughly 18 Ahr.

TABLE 1

High Current Discharge Test for Xell-18

| Time (hr) | Voltage | Current (A) | Charge Out (Ahr) | Power (W) | Energy Out (Whr) |
|---|---|---|---|---|---|
| 0 | 14.39 | 0 | 0 | 0 | 0 |
| 0.000278 | 11.54 | 96 | 0.02672 | 1107.84 | 0.3083488 |
| 0.008333 | 11.14 | 90 | 0.75167 | 1002.6 | 8.3842918 |
| 0.025 | 10.78 | 86.1 | 2.18667 | 928.158 | 23.8535918 |
| 0.05 | 10.81 | 86.3 | 4.34417 | 932.903 | 47.1761668 |
| 0.066667 | 10.82 | 86.4 | 5.78417 | 934.848 | 62.7569668 |
| 0.083333 | 10.8 | 86.2 | 7.220836667 | 930.96 | 78.2729668 |
| 0.1 | 10.69 | 85.3 | 8.642503333 | 911.857 | 93.47058347 |
| 0.116667 | 10.57 | 84.5 | 10.05083667 | 893.165 | 108.3566668 |
| 0.133333 | 10.44 | 84 | 11.45083667 | 876.96 | 122.9726668 |

Performance Overview:

Overall, the Xellerion, Xell-18, 18 Ahr, Ni—Zn battery pack performs as expected from the Evionyx technical specification sheet. The test results are compared with the specifications in Table 2.

TABLE 2

Test Results Compared to Xell-18 Specifications

| | Xell. Specifications | Test Results |
|---|---|---|
| Nominal Capacity | 18 Ahr @ 9 A | 18-19 Ahrs @ 9 A |
| Nominal Voltage | 13 V @ 9 A | 13.3 V @ 9 A |
| Nominal Energy | 234 Whr @ 9 A | 250 Whr @ 9 A |
| Peak Current | 100 A | 96 A |
| Internal Resistance | <30 mohm @ OCV | <30 mohm for SOC >60% |
| Recommended Charge Time | 4 hr @ CC/CV | about 4 Hr @ CC of 4.5 A |
| High Limit Voltage for Charging | 15.36 V @ 4.5 A | 15.36 V @ 4.5 A |

TABLE 2-continued

Test Results Compared to Xell-18 Specifications

| | Xell. Specifications | Test Results |
|---|---|---|
| Low Limit Voltage for Discharging | 10.4 V @ 9 A | 10.4 V @ 9 A |
| Charging Temperature Range | −10° C.-about 45° C. | 20° C.-about 30 ° C. |
| Discharging Temperature Range | −20° C.-about 60° C. | 20° C.-about 30° C. |
| Recommended Storage Conditions | −20° C.-about 25° C. | 15° C.-about 25° C. |

An important feature of this battery pack is the stability of the cells. After repeated cycling at nearly 100% depth-of-discharge, including the high rate discharge discussed in the previous section, all of the cells have the same voltage to within 0.01 volts.

Each cycle requires 7 hours, and nearly one megabyte of memory for data storage. The cycle testing is proceeding well with no deterioration in pack performance after 15 cycles. The cycling continues at one to two cycles per day for as long as possible.

Pack Cycling:

Manual cycling of the pack continued until another backup pack is secured. A total of 33 cycles is obtained with human monitoring. Based on personal experience with the pack, automated timed cycles are considered to be the most reliable approach in the near term. Two 120 Vrms driven relays capable of 16 A DC on the output are chosen as the drive switches. The 120 Vrms inputs to these relays are provided by Intermatic digital timers plugged into the wall outlet. These timers can be set for up to 14 on-off cycles per day, with one minute increments in the switching times. These timers are set for 3 cycles a day. After a few cycles to get the timing adjusted, the cycle settled into 110 minutes constant load discharge (at about 9.4 A), about 69 minutes rest, 232 minutes charge at 4.56 A, and about 69 minutes rest. The rest periods are not all the same, but the total daily rest is 69×6=414 minutes of rest per day. The charge and discharge times are fixed at 232 minutes and 110 minutes per cycle. With these currents and times, the charge exchanged in each cycle is roughly 17.5 Ah. In this instance, the total number of cycles is 127. The capacity and charge-discharge characteristics of the pack show little change during the cycling. After the 127 cycles, the pack is still using the same timed cycle.

Figure 8:
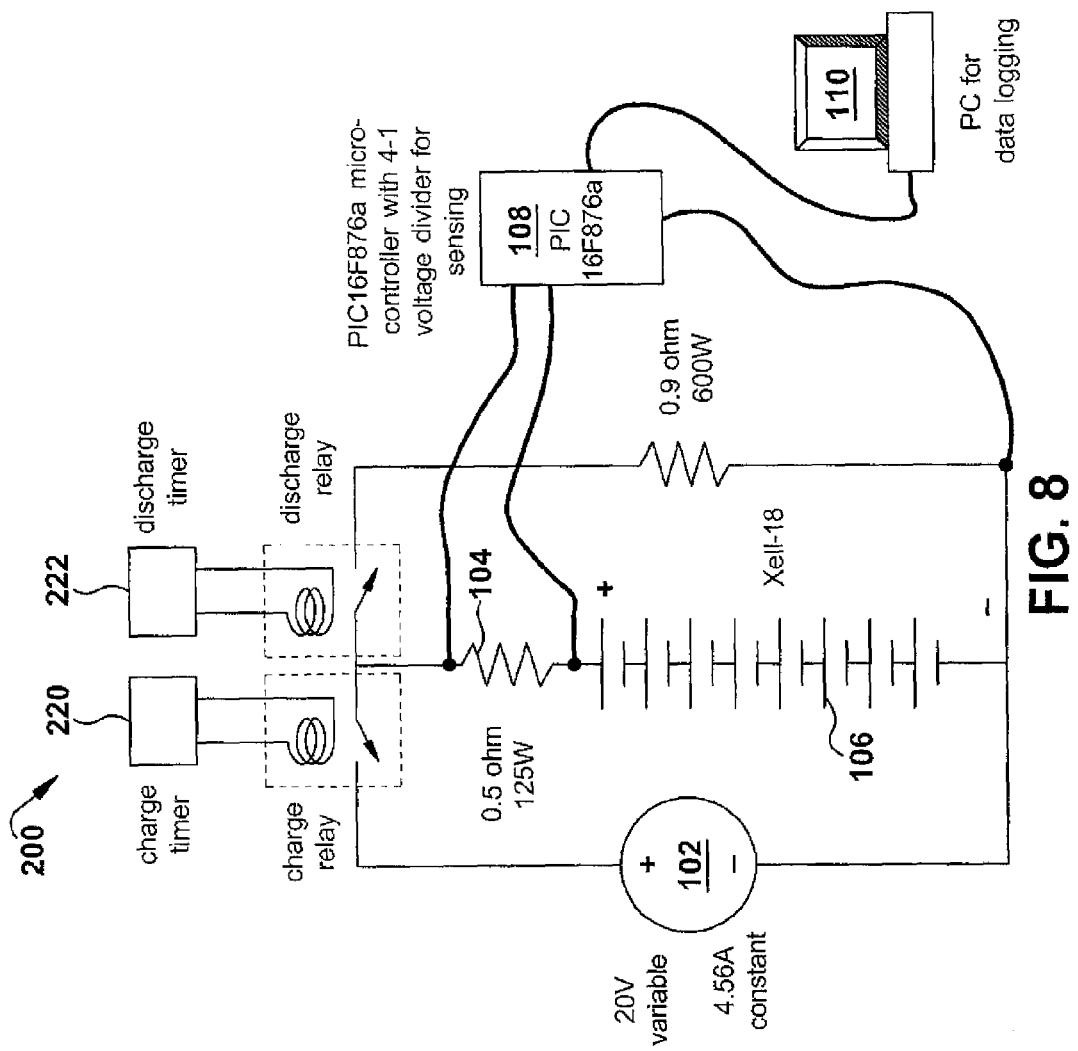
FIG. 8 is a schematic illustration of a testing apparatus according to one embodiment of the present invention for timer based automated pack cycling.

Turing to FIG. 8, Figure is a schematic illustration of a testing apparatus according to one embodiment of the present invention for timer based automated pack cycling. In the set-up of FIG. 8, like parts with the set-up of FIG. 5 are denoted using the same reference numerals.

Apparatus 200 in accordance with one embodiment of the present invention is shown in FIG. 8. Charging is controlled by a constant current power supply 102, which maintains the current at roughly 4.5 A. Discharge is controlled by a constant resistance load, of 1.4 ohms total. A 0.5 ohm resistor 104 is placed in series with the battery pack 106 to monitor the pack current. The voltage is measured on either side of the sense resistor with respect to ground to determine the current. These voltage measurements are each stepped down through 4-1 voltage dividers composed of four 1 kohm resistors in series. A PIC16F876a microcontroller 108 measures the voltages on the first resistor of the four-resistor stacks, using its on-board 10 bit ND converters, where 1023 is equivalent to 5 V. This voltage is corrected for any resistance variations using software, and then multiplied by four to provide the correct voltage. The difference of the two voltages is then multiplied by two (due to the half ohm resistor), to yield the correct current. The PIC microcontroller uses an internal clock to sample the voltages once per second, and then digitally sends the time, the two voltages, and the current to a PC 110 through a serial port for data-logging as a text (TXT) file using comma separated variables (CSV). The main difference between the set-up of FIG. 5 and the set-up of FIG. 8 is that the device of FIG. 8 has charge time/charge relay unit 220 and a discharge timer/discharge relay unit 222 as shown in the schematic of FIG. 8.

Xellerion Electric Bike:

An gently used Xellerion electric is obtained. The power supply for the bike is two 13 V Xellerion 18 Ah battery packs connected in series, thus making a combined 26 V, 18 Ah pack. Of the two batteries, one is found to be at about 8 V, and the other has a negative voltage. The battery charger appears to be working, but seems to have some unexpected modes of operation that probably allow the pack to continue to discharge when the users thought it is charging. The stronger of the two 13 V packs drove the weaker one into reversal, which is why its voltage went negative. Some nursing brought the stronger 13 V pack back into operation, but the weaker pack could not be saved and did not regain functionality. The on-board balancer is removed to see if it may be damaged and preventing the pack from recovering.

The damaged 26 V Ni—Zn pack is temporally replaced by a 24 V lead-acid pack, and the bike works fine. Two new Ni—Zn packs are obtained from Xellerion and are used in the bike for about a month. The new Ni—Zn packs have no pack management system.

Figure 9:
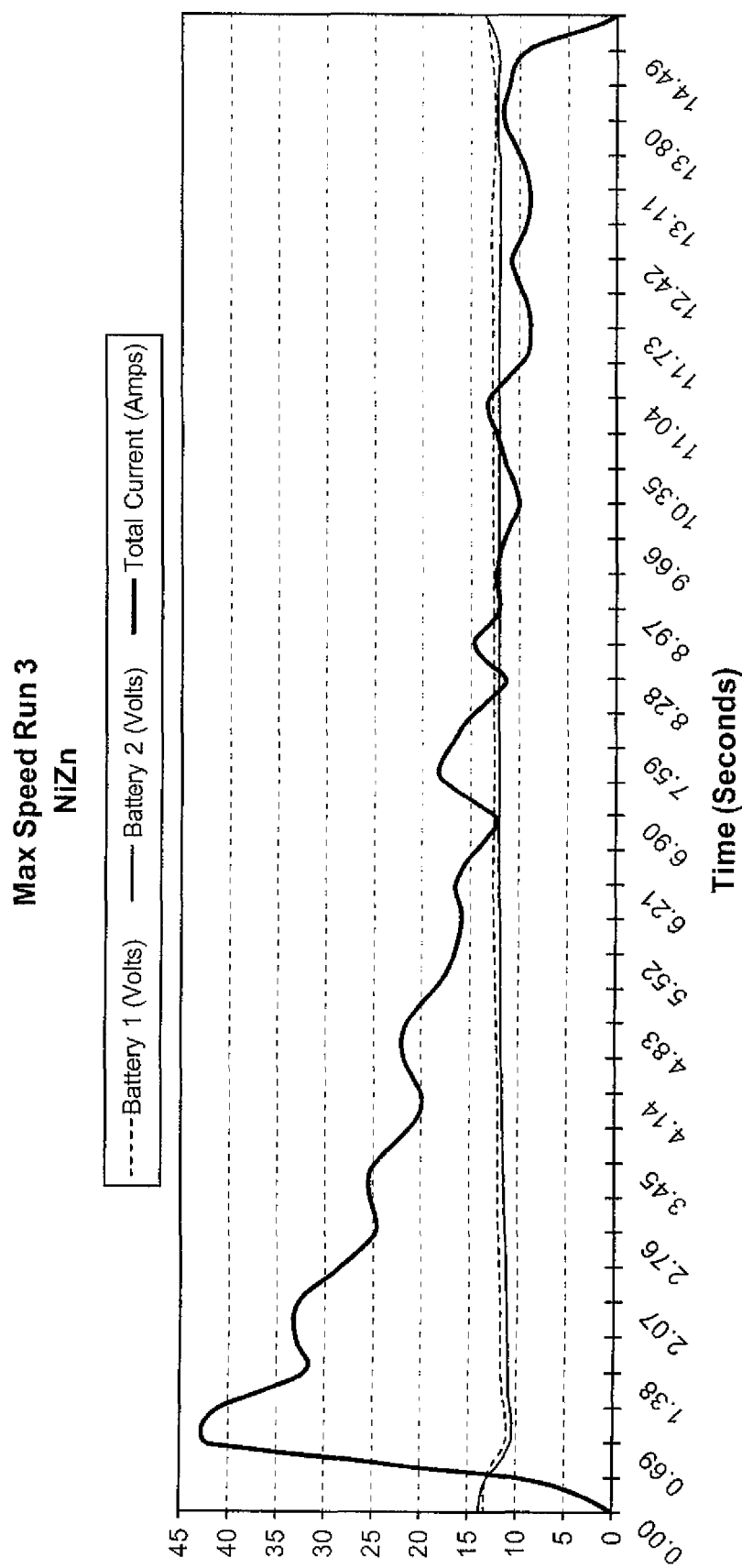
FIG. 9 is graph representing Xellerion electric bike acceleration transient, showing each 13 V pack voltage and the current versus time where the vertical axis is "amps" for current or "volts" for voltages.
Figure 10:
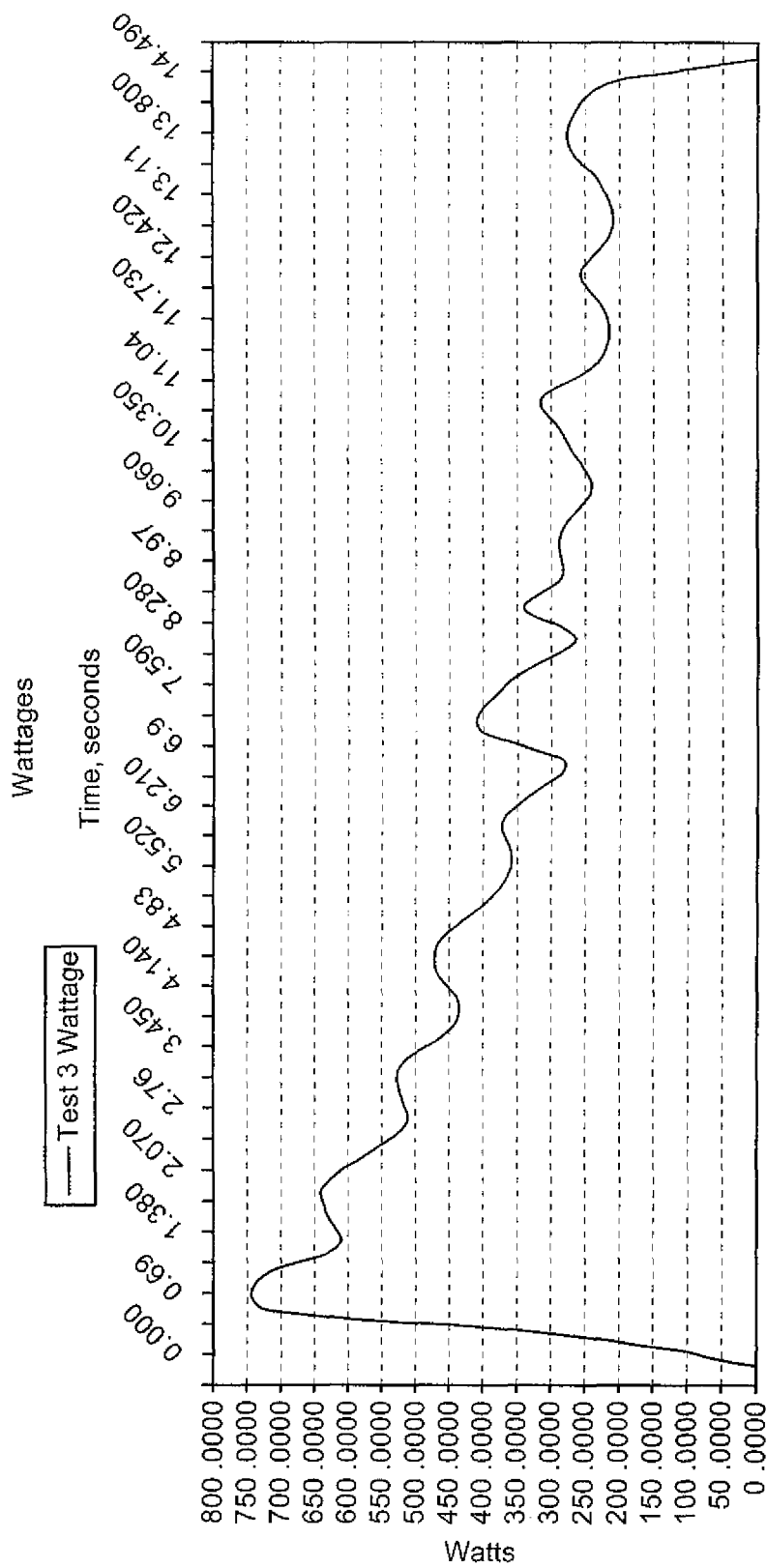
FIG. 10 is graph representing Xellerion electric bike acceleration transient, showing the overall pack power-out versus time.

A five man student team composed mostly of freshmen cyclists works with the bike for about six weeks. They implement an on-board microcontroller to monitor the pack voltages and current. They send this data wirelessly to a laptop for data-logging. Included in this data is acceleration data. A typical 15 second acceleration transient is shown in FIG. 9. Notice that the 26V Ni—Zn pack has no problem providing over 40 A. FIG. 9 also shows the two 13 V pack voltages. FIG. 10 shows the associated power transient. The 26 V pack is easily able to provide one horsepower (746 W).

As noted above, Figure is a graph illustrating Xellerion electric bike acceleration transient, showing each 13 V pack voltage and the current versus time. The vertical axis is "amps" for current or "volts" for voltages. FIG. 10 is a graph illustrating Xellerion electric bike acceleration transient, showing the overall pack power-out versus time.

Two 8-cell packs are received and both packs are fully charged when they are received. One pack is cycled as discussed above. The other pack is permitted to sit at room temperature for just over approximately 4 months. Thus by choosing 130 days as the storage period for the battery, one can be confident that the error is no more than a week.

Figure 11A:
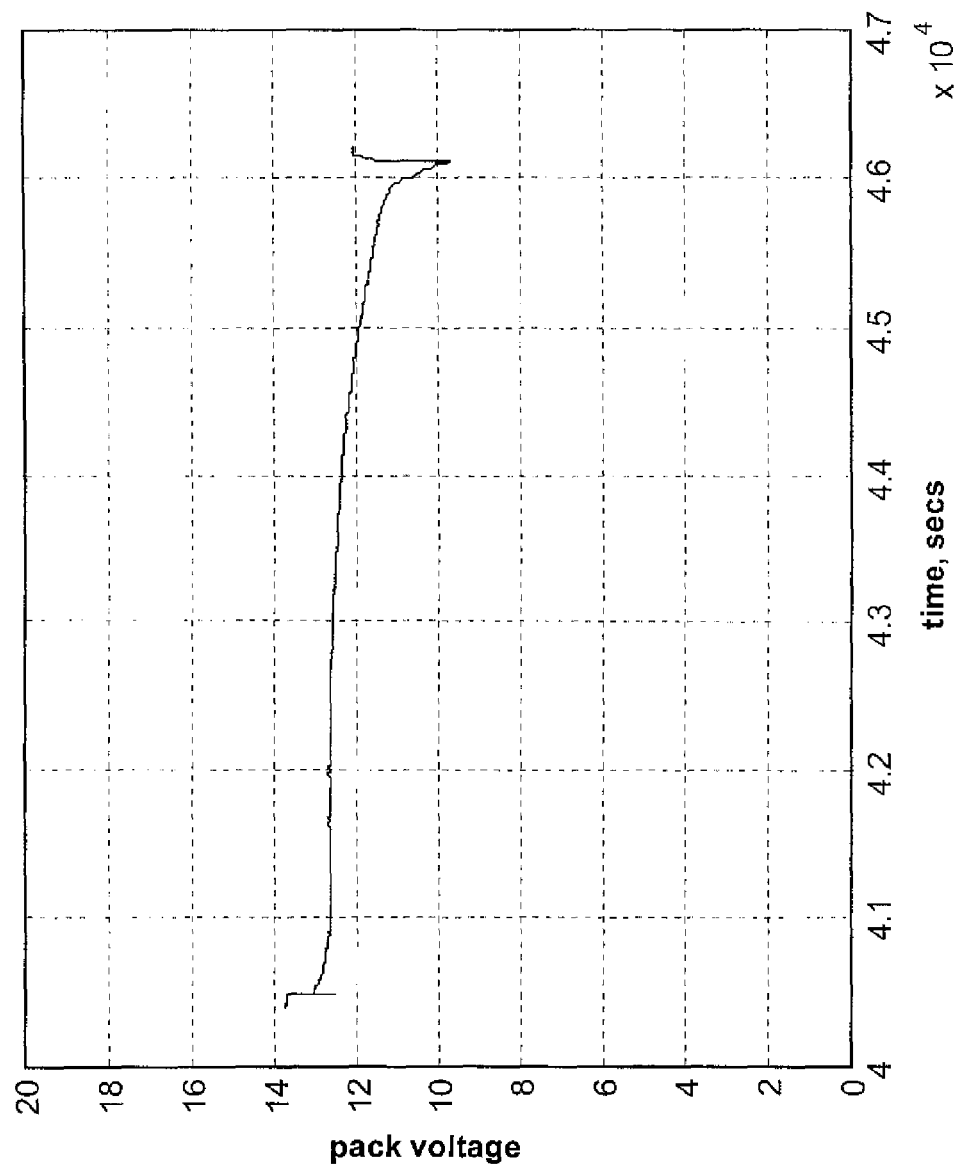
FIGS. 11A, 11B and 11C are plots of pack voltage, current and charge removed.
Figure 11B:
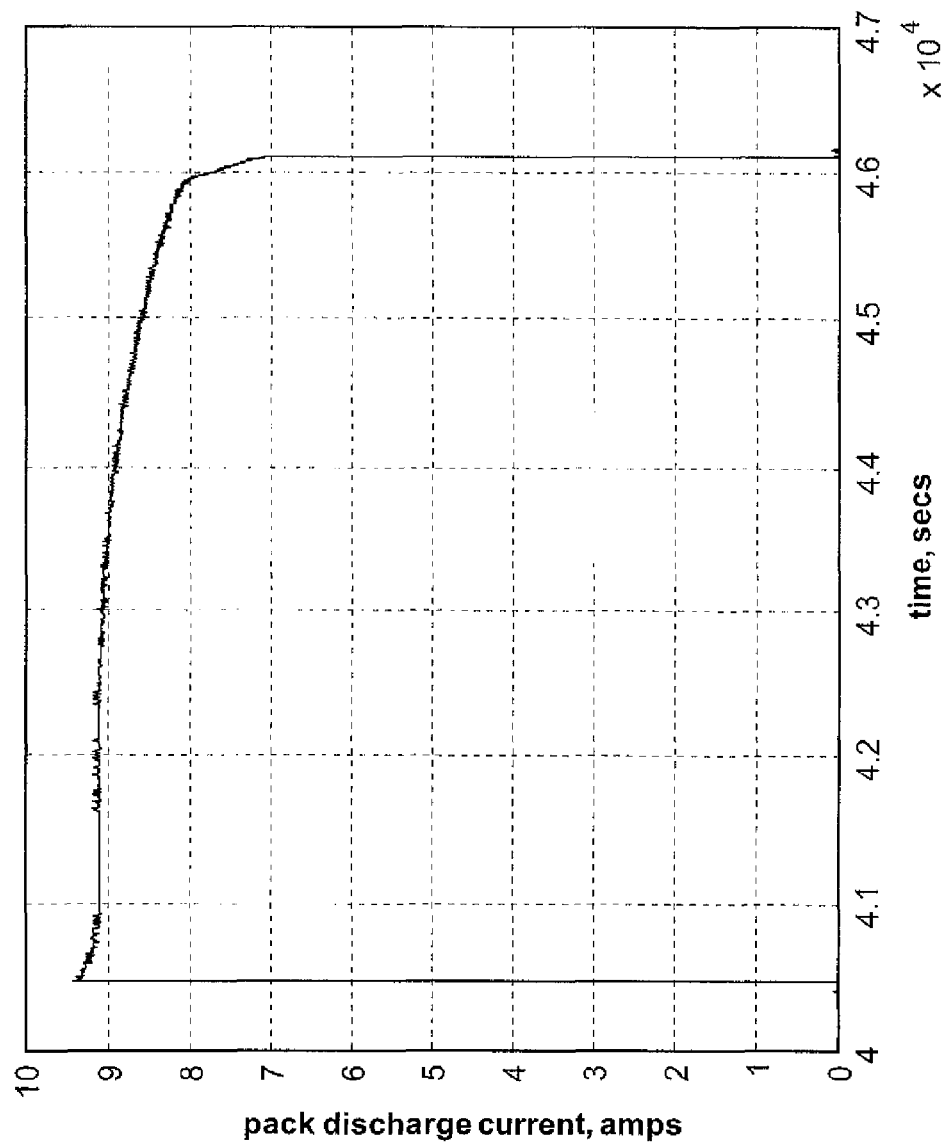
Figure 11C:
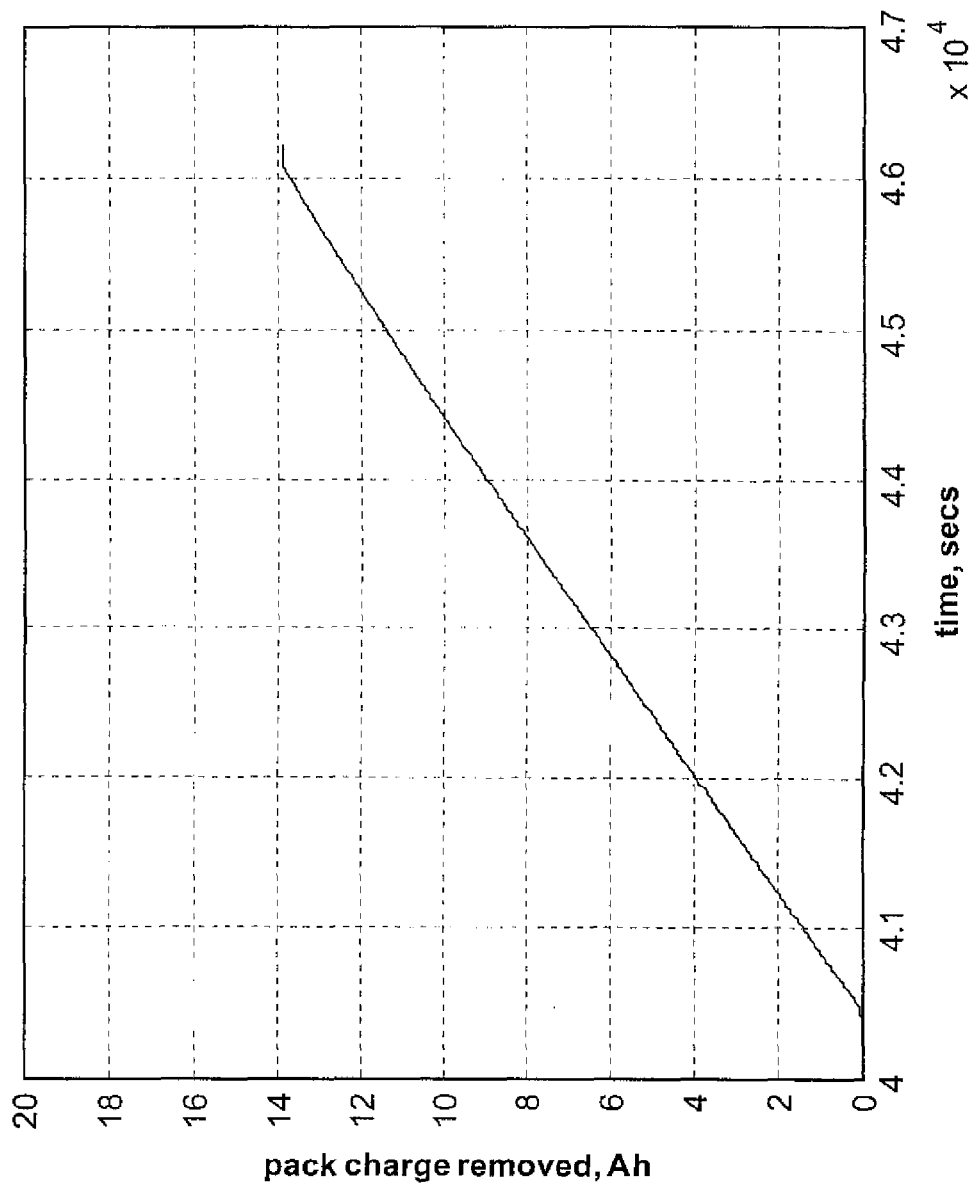

After the approximate 4 month period, the cycling pack is disconnected from its cycling apparatus, and the stored pack is connected. It is subsequently discharged, and then disconnected. During the 9 A discharge, 13.86 Ah of charge is removed from the pack, in 5565 seconds, which is 1.57 h. Plots of the pack voltage, current, and charge removed are given in the graphs of FIGS. 11A, 11B and 11C.

There are two ways to calculate the self-discharge rate. The first is to assume an exponential decay in the stored charge, that is:

$$q_s(t) = q_s(0) e^{-t/k} \text{Ah}.$$

In this equation, the initial stored charge is $q_s(0)=18$ Ah, the measure stored charge after 130 days is $q_s(130 \text{ days})=13.86$ Ah, and the elapsed time is t=130 days. Thus, $$13.86 = 18 e^{-130/k} \text{Ah}.$$

Solving this equation for the time constant k, gives $$k = \frac{-130}{\ln(13.86/18)} = 497.4 \text{ days}.$$

Thus, when the elapsed storage time is 497.4 days, or about a year and a half, the remaining stored charge will be about 37 percent, or 6 Ah.

A second calculation assumes an equal average loss every day. The stored charge lost is the difference between the initial stored charge and the final stored charge, which in this case is 4.14 Ah. As this loss occurred over 130 days, the average charge lost per day is $$\Delta q_s = \frac{4.14 \text{ Ah}}{130 \text{ days}} = 0.03185 \text{ Ah/day}$$

or about 0.177 percent per day. At this rate, the pack would totally self-discharge in 565.1 days.

In using either calculation for self-discharge rate, it is clear that the rate is low compared to many battery chemistries in use today.

After the 130 day period, it is decided that a microscopic analysis of the cycled electrodes could provide useful information. The cycled pack is removed from cycling in the middle of cycle number 170, after normal discharge. Cell number 3 is removed from the pack and further discharged through a 0.1 ohm resistor at about 9 to 10 amps for about 10 minutes. This yields roughly another 1.5 Ah of stored charge after the normal discharge cycle ended. This is done so as to not leave substantial energy in the cell during its disassembly.

After this, the second stored pack is attached to the cycling apparatus, and discharged for the self-discharge test as discussed in the previous section. Cell number 9 is selected as the "pristine cell" and removed from the pack for microscopic comparison with the cycled cell. It is further discharged through the 0.1 ohm resistor to remove any substantial energy. These two cells are forwarded to the polymer chemist for microscopic analysis.

Cell number 10 is removed from the stored pack, and added to the cycled pack to maintain a 13 V pack. It should be noted that some of the cells has "pillowed" slightly when the pack is disassembled. Upon reassembly, it is necessary to squeeze the pack to get it back inside the blue mechanical containment assembly. In fact, it is necessary to use a large clamp to accomplish this, however great care is taken during this process to not over stress the cells.

About one month later, at cycle number 236, another set of cells is subjected to microscopic analysis, and cycling is again halted. During the first 170 cycles, the pack capacity under timed cycles has diminished by less than about 5 percent, and is so insignificant that it is not distinguishable from testing noise. During the next 65 cycles after pack disassembly, the pack performance appears to degrade. The performance seems to get progressively worse, and over time, 14 minutes are removed from the discharge cycle out of the original 110 minutes. Although this is a concern, occasional monitoring of the individual cell voltages reveals that the cells are still within a few volts of one another. By chance, these cell voltage measurements are always done during charging. At the same time, on the last discharge cycle before removing the pack to remove a cell, the pack voltage has decreased to about 9 V. In fact, the last several cycles has about 9V as their low voltage. At the same time, the individual cell voltages are all measured to be about 1.5V. At 1.5V per cell, the pack voltage should have been at 12V. Upon careful re-measurement, cell number 2 has a voltage of −1.5 V, which explains the pack voltage of 9 V. Using sensing by hand, cell number two is also noticeably warmer than the other cells, at about 115° F.

The following scenario is postulated to explain this. When reassembling the pack on after the first disassembly it had to be squeezed back together. This apparently damaged one cell, by either putting a small hole in the membrane which allowed self-discharge, or it squeezed some of the electrolyte out of part of the membrane which then prevented the adjacent material from being cycled. Over time, there was less and less energized material in the cell, and its voltage would eventually reverse, which degraded the performance of the entire pack. This process was probably going on since cycle 170, and the data indicates that the reversal may have begun at the same time. Thus cell number 2 may have undergone up to 65 reversals of progressively longer times, and almost certainly 30 reversals. It is an interesting observation that this overdischarge experiment reveals that the Ni—Zn cells are relatively stable to over-discharge and reversal. It should be noted that the cell is absorbing about 14 W during those reversals. The lesson is to not disassemble a pack once it is in use. This damage to the cell is most certainly caused by the experimenter and not by the manufacturer, but has provided useful information.

The following cells are presented to the polymer chemist for microscopic analysis: cell number 1, which has undergone 235 cycles; cell number 11 which is the pristine cell from the stored pack with 2 cycles; and cell number 2 which has undergone 235 cycles, but is certainly damaged and had undergone at least 30 reversals of increasing length.

The two packs are reassembled using spacers for the missing cells and only enough squeezing to hold the packs together. The cycling pack consists of cells number 4, 5, 6, 7, 8 from the first pack having 235 cycles, cell number 10 from the second pack having 66 cycles, and cells number 12 and 13 from the second pack having 2 cycles. The cells all appear to be strong healthy cells, and are balanced by hand to be within 0.1 V of one another. To prevent any further over-discharge or overcharge of any cell, an individual pack monitor is designed and constructed. This device is shown in FIG. 12.

Figure 12:
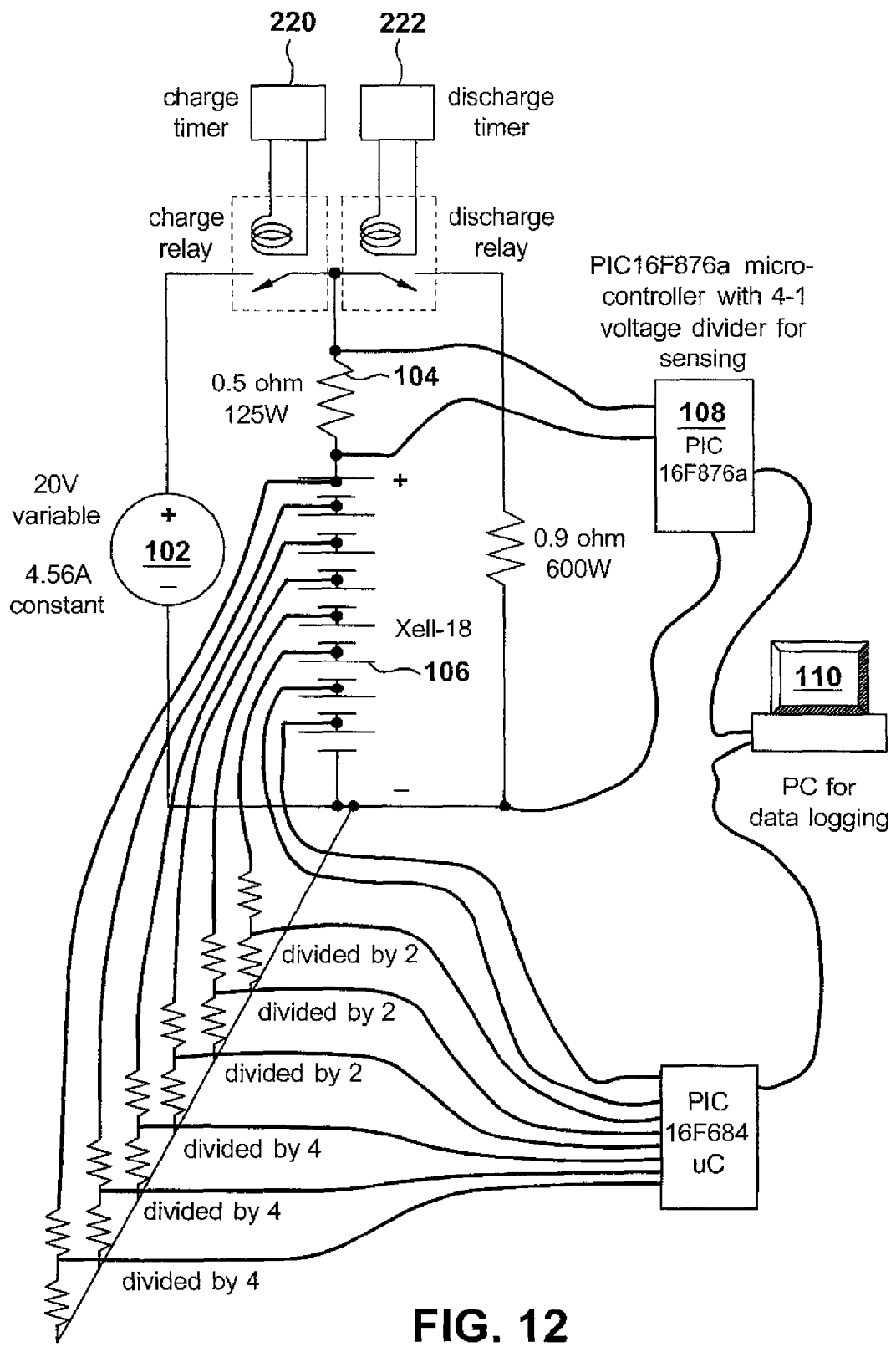
FIG. 12 is a schematic illustration of a timer based automated pack cycling device with individual cell monitors according to one embodiment of the present invention.

As can be seen in FIG. 12, the set-up disclosed therein, apparatus 300, is similar to that shown in FIG. 8. Charging is controlled by a constant current power supply 102, which maintains the current at roughly 4.5 A. Discharge is controlled by a constant resistance load, of 1.4 ohms total. A 0.5 ohm resistor 104 is placed in series with the battery pack 106 to monitor the pack current. The voltage is measured on either side of the sense resistor with respect to ground to determine the current. These voltage measurements are each stepped down through 4-1 voltage dividers composed of four 1 kohm resistors in series. A PIC16F876a microcontroller 108 measures the voltages on the first resistor of the four-resistor stacks, using its on-board 10 bit ND converters, where 1023 is equivalent to 5 V. This voltage is corrected for any resistance variations using software, and then multiplied by four to provide the correct voltage. The difference of the two voltages is then multiplied by two (due to the half ohm resistor), to yield the correct current. The PIC microcontroller uses an internal clock to sample the voltages once per second, and then digitally sends the time, the two voltages, and the current to a PC 110 through a serial port for data-logging as a text (TXT) file using comma separated variables (CSV). The main difference between the set-up of FIG. 12 and the set-up of FIG. 5 is that the device of FIG. 12, like that of FIG. 8, has charge time/charge relay unit 220 and a discharge timer/discharge relay unit 222 as shown in the schematic of FIG. 12. Additionally, the set-up of FIG. 12 also has a series of resistors and a second micro-controller as shown in the lower portion of FIG. 12. The set-up of FIG. 12, piggybacks onto the other sensor, and stores individual cell voltages on a PC for later analysis.

Figure 13:
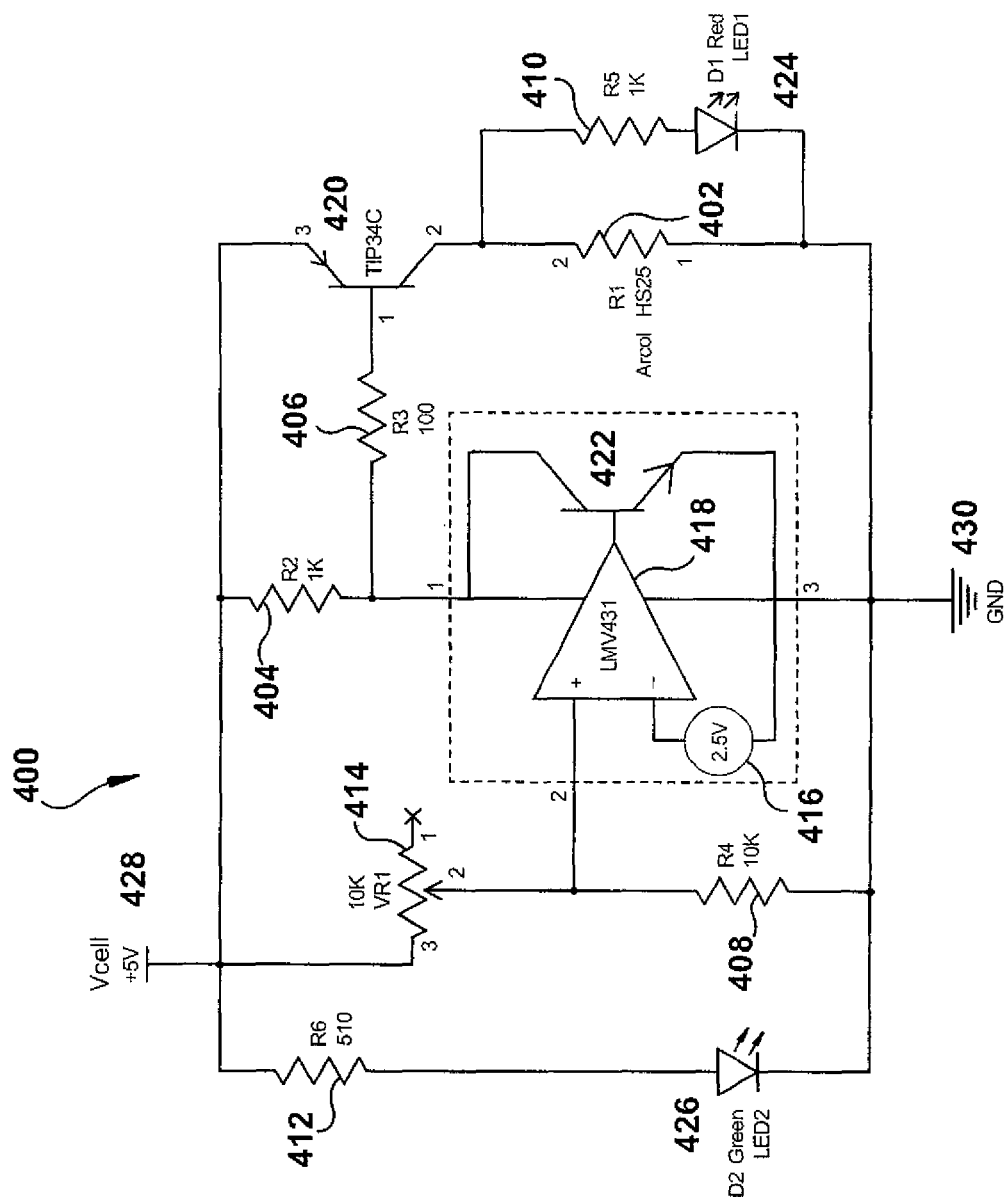
FIG. 13 is a by-pass circuit according to one embodiment of the present invention for use in conjunction with the various devices of the present invention.

Given the above, a management system according to FIG. 13 will be utilized. In one embodiment, each 8-cell pack will have a microcontroller. This microcontroller will monitor the cell voltages based on the circuit of FIG. 13. A centralized pack manager will monitor the individual cell managers for high and low voltages. If low voltages are being detected during use, a warning will be given to the user. If high voltages are being detected during charging, the microcontrollers will turn on a by-pass to reduce the amount of charge going to that cell while allowing the other cells to charge. The pack charger will have the ability to reduce the charging current as more cells go into by-pass.

Figure 14:
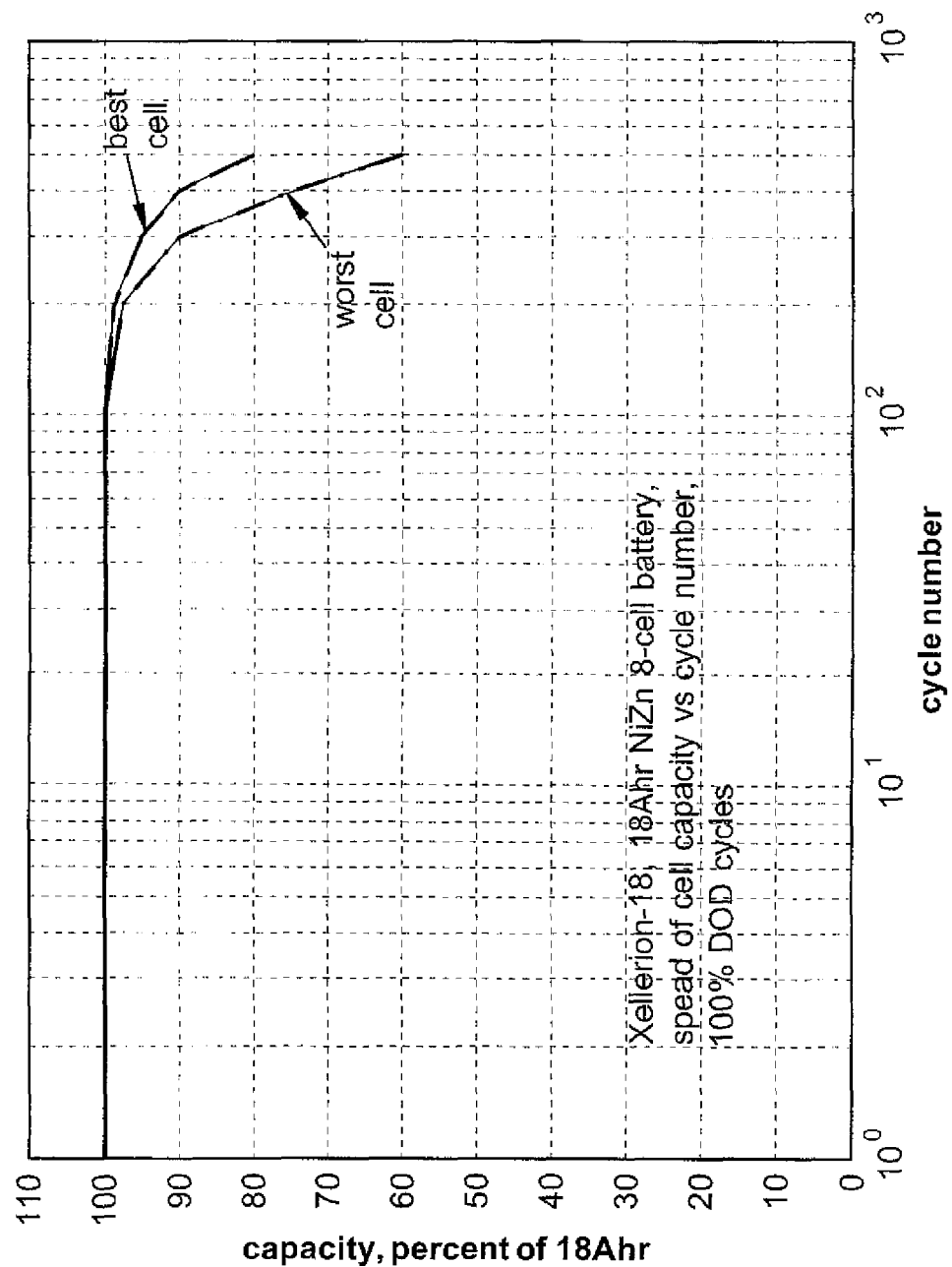
FIG. 14 is a graph showing cycle life performance of an Xell-18 pack for 500 cycles of 100% DOD.

The Xell-18 battery pack is permit to cycle for 500 cycles. The cells maintain similar performance for at least half of the test. A pack balancer is implemented at cycle 281 to keep the cells in balance for the remaining cycles. Of the eight cells in the original pack, 3 are removed at various times for destructive microscopic analysis. Taking the pack apart for the removal of these cells disrupts the fixed cell geometry and leads to a more rapid degradation of all the cells. FIG. 14 is a graph illustrating cycle life performance of the Xell-18 pack, for 500 cycles of 100 percent DOD.

Regarding the by-pass circuit 400 of FIG. 13, the inventive by-pass circuit 400 comprises six resistors 402 (1 ohm-25 watt), 404 (1000 ohms-0.25 watt), 406 (100 ohms-0.25 watt), 408 (10000 ohms-0.25 watt), 410 (100 ohms-0.25 watt) and 412 (510 ohms-0.25 watt). Circuit 400 further comprises a variable resistor 414 that varies between 0 ohms and 10000 ohms, the dashed box is an LM431 (from National Semiconductor) that includes among other components 2.5 volt voltage source 416 and a transistor 422, transistor 420 is a TIP34C, a red LED 424, a green LED 426, a V cell 428 and a ground 430. Additionally, the circuit of FIG. 13 is designed for use with a wide variety of battery chemistries including lithium-based batteries.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A device for stabilizing a battery cell comprises:
- a comparator having an input and an output, wherein said input is configured to monitor the voltage of the battery cell in comparison to a reference voltage;
- a series coupled potentiometer and a first resistor adapted to be coupled in parallel with the battery cell, wherein said input is coupled to a node between said potentiometer and said first resistor, such that said potentiometer is adjusted to set a voltage across said first resistor based on the battery cell type;
- a first transistor having an input and an output, such that said input of said first transistor is coupled to said output of said comparator, such that the output of said comparator controls the on and off state of said output of said first transistor; and
- a second transistor having an input and an output, such that said input of said second transistor is coupled to said output of said first transistor to control the on and off state of said output of said second transistor, and said output of said second transistor is coupled in series with a second resistor, wherein said input of said second transistor and said second resistor are in parallel with said output of said first transistor, and wherein the battery is coupled in parallel with the output of said second transistor and said second resistor;
- wherein when said comparator detects that said voltage across said first resistor is approximately greater than or equal to said reference voltage, said first transistor is turned on by said output of said comparator, and said second transistor is turned on by said output of said first transistor, such that electrical current applied to the battery cell is shunted away from the battery cell and through said output of said second transistor to said second resistor.

2. The device of claim 1, further comprising a potentiometer coupled to said input of said comparator to adjust said reference voltage.

3. The device of claim 1, further comprising:
- an opto-isolator having an input coupled to said input of said comparator; and
- a controller coupled to said opto-isolator, said controller configured to place said opto-isolator into either of an on or off state, such that when said opto-isolator is turned off, the device is disabled, and when said opto-isolator is turned on the device is enabled.

4. A method for stabilizing a plurality of battery cells comprises the steps of:
- providing a stabilizing circuit having a charging path carrying electrical current to each battery cell coupled thereto, said stabilizing circuit including a bypass path associated with each battery cell coupled to said charging path, wherein each said charging path includes a series coupled resistor and a potentiometer that are in parallel with each battery cell;
- adjusting at least one potentiometer to set a voltage across at least one said resistor based on the battery cell type;
- providing a controller coupled to said stabilizing circuit to monitor the voltage of each battery cell as said charging circuit charges the battery cells;
- determining whether the voltage of each battery cell is approximately greater than or equal to a reference voltage by said monitoring circuit; and
- shunting the electrical current from said charging path to said bypass path associated with each battery cell having a voltage that is approximately greater than or equal to said reference voltage.

5. The method of claim 4, further comprising the step of:
- providing an opto-isolator coupled to said stabilizing circuit to place said stabilizing circuit into either of an activated or inactivated state.

* * * * *